Oct. 28, 1952
R. ROTHWEILER
2,615,366
FILM IDENTIFYING DEVICE
Filed May 11, 1951
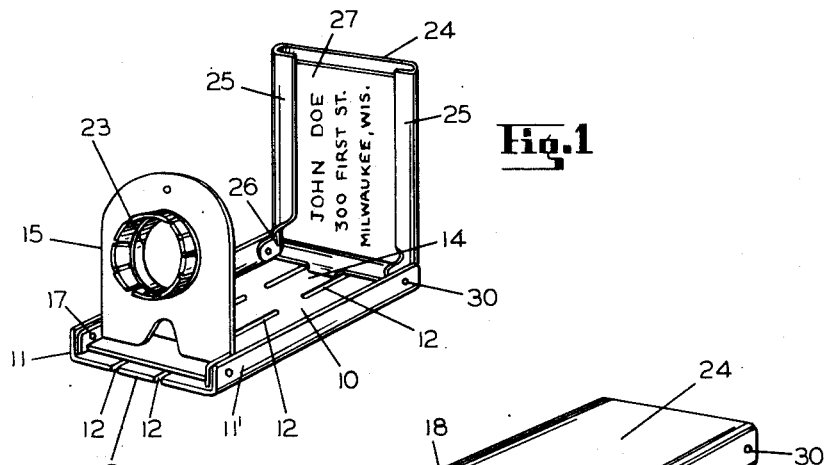
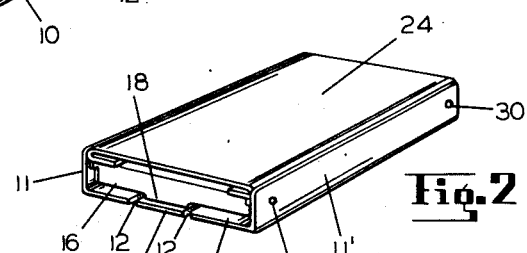
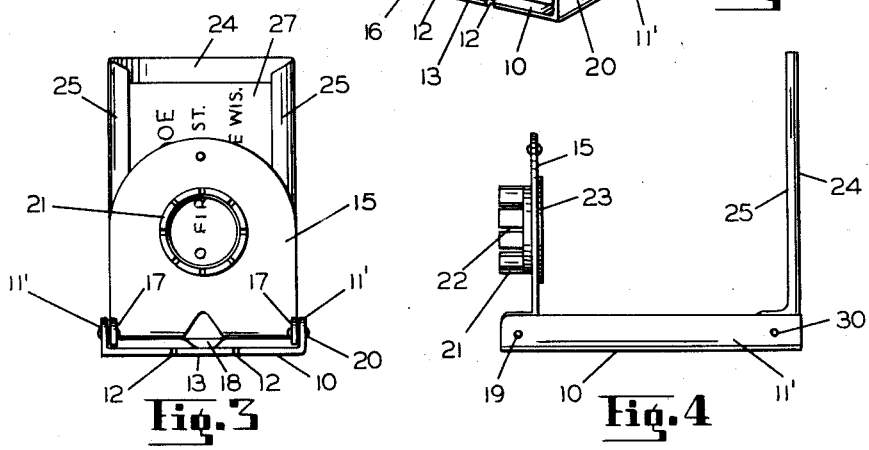
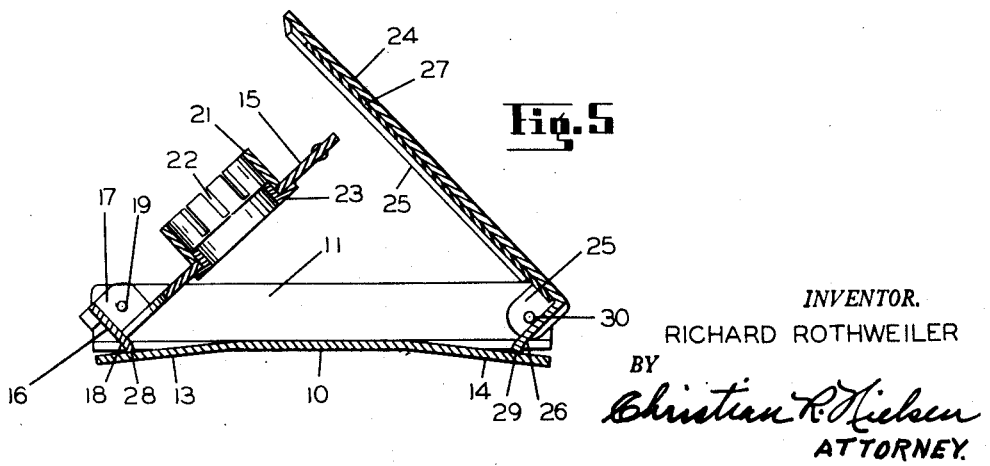
INVENTOR.
RICHARD ROTHWEILER
BY
Christian R. Nielsen
ATTORNEY.

Patented Oct. 28, 1952

2,615,366

UNITED STATES PATENT OFFICE 2,615,366

FILM IDENTIFYING DEVICE

Richard Rothweiler, Milwaukee, Wis., assignor to The David White Company, Milwaukee, Wis., a corporation of Wisconsin Application May 11, 1951, Serial No. 225,758

3 Claims. (Cl. 88—24)

My invention relates to identifying devices, and more particularly to a device that permits identifying photographic films.

Still another object of my invention is to provide a device that is designed to be applied to, and brought into engagement with, the lens mount of a camera when in use.

A further object of my invention is to provide a device in which the identification copy may be changed easily, without the use of tools or mechanical skill.

A still further object of my invention is to provide a device that is inexpensive and easy to manufacture, yet highly efficient for the purpose for which it is intended.

It is manifest to anyone familiar with photography, that conventional photo films having a plurality of exposures progressively pass through the camera, and that identification of the film is a convenience, if not a necessity, so that subject matter as well as ownership of the film may be established.

The device described, illustrated and claimed herein permits easy attachment to the camera inasmuch as the unit into which the identifying legend or copy has been placed is placed into engagement with the lens mount on the camera, and a photograph of the identifying legend may be recorded on the film, thereby providing a permanent, clear identification.

Other and further objects of my invention will become more apparent as the description proceeds, when taken in conjunction with the drawing in which:

Figure 1 is a perspective view of the assembled device in an open position.

Figure 2 is a perspective view of the assembled device in a folded, compact position.

Figure 3 is a front view of the device in an open position when facing the camera lens.

Figure 4 is a side view of the device in an open position, and

Figure 5 is a longitudinal cross-sectional view of the device, partially open, showing the resilient spring members forming a part of the bottom plate, flexed to a neutral position.

Similar characters of reference indicate corresponding parts throughout the several views, and referring now to the same, the character 10 shows a base plate which has longitudinal upwardly disposed end walls 11 and 11' which are formed at right angle to the base 10. The base 10 has inwardly disposed slots 12 cut from the oppositely disposed lateral edges of the plate 10 inwardly, to provide spring portions 13 and 14.

There is a front plate shown as 15, which has an angular member 16, extending across the lower end thereof, and side plates shown as 17 are bent upward therefrom so that the front plate 15 may be hingedly mounted at 19 by means of rivets 20. The member 16 has a projecting member 18 extending parallel thereto, and at right angle to the plate 15.

There is a circular ferrule member 21 inserted into the front plate 15, and this ferrule member 21 has inwardly disposed slots 22 which allow the ferrule to expand over the lens holder of the camera (not shown). The ferrule 21 is provided with an inwardly extending adapter 23 which is circular in form, and fits over the lens adapter on the camera.

The rear plate 24 provided with guide flanges 25 on each side thereof forming a channel, and a projecting member 26 is disposed at right angle from the rear plate 24 as shown in Figure 5 on the drawing. There is an identifying card shown as 27, slidably engaged within the channels 25 of the plate 24, and the plate 24 is attached to the upwardly extending walls 11 and 11' by means of rivets at 30.

In Figure 5, which shows a longitudinal cross-section of the entire device, it will be noted that the ends 18 and 26 of the plates 15 and 24 respectively, contact the spring portion 13 and 14 of the plate 10 at 28 and 29. This permits the plates 15 and 24 to be raised from a folded position as shown in Figure 2 to an upright or open position as shown in Figure 4, and by having the contact of the members 18 and 26 at 28 and 29 with the spring portions 13 and 14 respectively, the plates 15 and 24 will be retained in a vertical position, or in a closed position.

In operation, the ferrule 21 is placed over the lens holder on the camera which will place the legend bearing card 27 at a fixed distance from the lens of the camera, and as the shutter of the lens is opened, a photographic reproduction of the legend will be registered on the film within the camera. The device may be folded so that the plates 15 and 24 are disposed downward as shown in Figure 2, which makes for a handy, portable device that may be carried around in a handbag or pocket.

In the chosen embodiments of my invention, there are many features not heretofore disclosed in the prior art, and although I have shown a specific arrangement of the parts constituting the device, I am fully cognizant of the fact that many changes may be made without affecting the operativeness of the device, or without affecting the spirit of my invention or the scope of the appended claims.

Having thus described my invention, what I claim and desire to secure by Letters Patent in the United States is:

1. A film identifying device to be used in combination with a photographic camera, said device comprising, a flat base turned upward at both of its longitudinal edges, and having open slots extending inward from its lateral edges, a front plate, a rear plate, both said front and rear plates hingedly attached at one of their edges to the upwardly extending longitudinal edges of said base plate, said front and rear plates bent inward at right angle at their attaching ends, between their points of attachment to said base plate thereby providing contact members for slidably engaging with the base plate between said open slots, said front plate having a circular opening therein, a cylindrical adapter engaging said opening, said rear plate provided with means for supporting an identification card.

2. An identifying device to be used in combination with a photographic film, said device comprising, in combination, a flat base plate turned upward at both of its longitudinal edges, and having open slots extending inward from its lateral edges on both of its ends, a front plate, a rear plate, both said front and rear plates hingedly attached at one of their ends to the upwardly extending longitudinal edges of said base plate near the end thereof, said front and rear plate bent inwardly at right angle at their attaching ends between their points of attachment to said base plate, thereby providing contact members for engagement with the base plate between said open slots, said front plate having a circular opening therein, a cylindrical adapter engaging said opening, said adapter provided with inwardly disposed slots disposed from one edge thereof, said rear plate provided with channels along its oppositely disposed longitudinal edges for the engagement of identification means.

3. A film-identifying device adapted for use with a camera to record an identifying legend on the film in the camera, comprising a flat rectangular base turned upward at its longitudinal edges and including a resilient tongue located medially of each of its lateral edges, a front plate mounted on said base for pivotal movement about an axis adjacent and parallel to one of the lateral edges and having a finger slidably engaging the resilient tongue adjacent to said one lateral edge, a rear plate mounted on said base for pivotal movement about an axis adjacent and parallel to the other lateral edge and having a finger slidably engaging the resilient tongue adjacent to said other lateral edge, said plates being movable inwardly about their respective axes toward said base to a collapsed position and outwardly away from the base to a raised position wherein the front and back plates are substantially perpendicular to the base and parallel to each other, said resilient tongues acting on said fingers to urge the plates towards either of their said positions, said front plate having a circular opening therein, a cylindrical adapter carried by the plate and surrounding said opening and adapted to engage a lens mount on a camera, said rear plate being provided with means for supporting an identification card.

RICHARD ROTHWEILER.

REFERENCES CITED

The following references are of record in the file of this patent:

UNITED STATES PATENTS

| Number | Name | Date |
| --- | --- | --- |
| 1,590,770 | Merle | June 29, 1926 |
| 1,787,198 | Howell | Dec. 30, 1930 |
| 1,989,454 | Koster | Jan. 29, 1935 |